US006337487B1

(12) United States Patent
Dubuit et al.

(10) Patent No.: US 6,337,487 B1
(45) Date of Patent: Jan. 8, 2002

(54) ULTRAVIOLET RADIATION DRYING OVEN AND PRINTING MACHINE INCLUDING AT LEAST ONE SUCH DRYING OVEN

(75) Inventors: Jean-Louis Dubuit, Paris; Frédéric Airoldi, Servon, both of (FR)

(73) Assignee: Societe d'Exploitation des Machines Dubuit, Noisy le Grand (FR)

( * ) Notice: Subject to any disclaimer, the term of this patent is extended or adjusted under 35 U.S.C. 154(b) by 0 days.

(21) Appl. No.: 09/370,164

(22) Filed: Aug. 9, 1999

(30) Foreign Application Priority Data

Aug. 13, 1998 (FR) .......................................... 98 10378

(51) Int. Cl.[7] ............................................ G01N 21/00

(52) U.S. Cl. .............................. 250/497.1; 250/498.1; 250/453.11; 250/454.11; 250/455.11; 250/504 R

(58) Field of Search ......................... 250/504 R, 497.1, 250/498.1, 453.11, 454.11, 455.11

(56) References Cited

U.S. PATENT DOCUMENTS

| | | | | |
|---|---|---|---|---|
| 4,008,401 A | | 2/1977 | Holoubek et al. | 250/453 |
| 4,048,916 A | | 9/1977 | Silverman et al. | 101/40 |
| 4,193,204 A | | 3/1980 | Nerod | 34/4 |
| 4,584,480 A | * | 4/1986 | Silverman et al. | 250/453.1 |
| 5,595,118 A | | 1/1997 | Villaverde et al. | 101/424.1 |

* cited by examiner

*Primary Examiner*—Bruce Anderson
*Assistant Examiner*—Nikita Wells
(74) *Attorney, Agent, or Firm*—Young & Thompson

(57) ABSTRACT

An ultraviolet radiation drying oven includes a lamp with a localized opening for radiation to pass through and, associated with the opening, a mask mounted to move between a closed position and an open position, the mask being divided into two shutters and being coaxial with another mask also divided into two shutters.

11 Claims, 3 Drawing Sheets

FIG 2
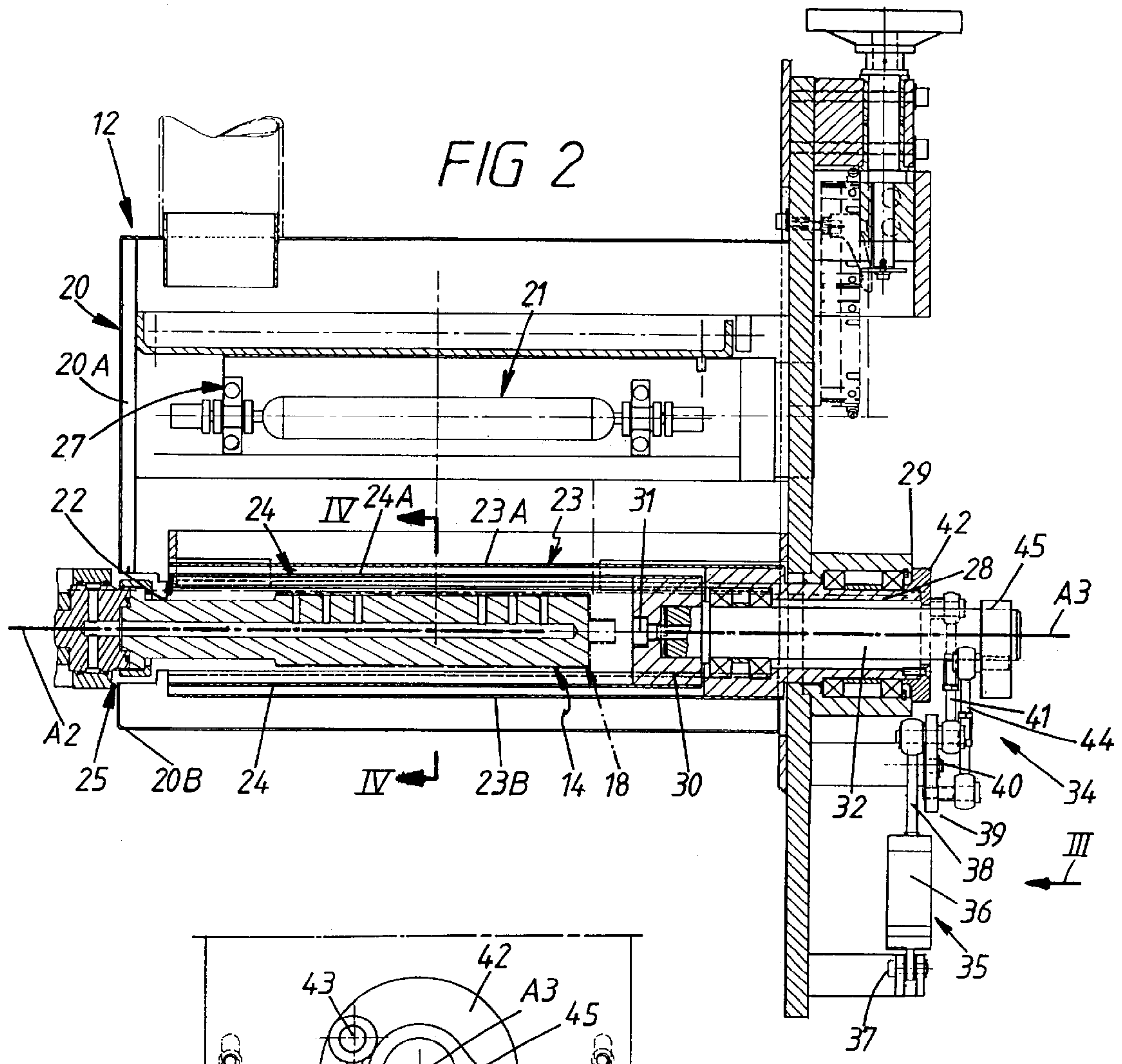
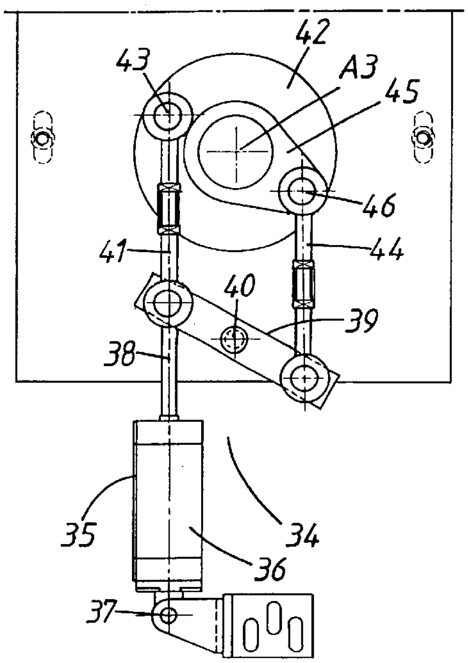
FIG 3

ULTRAVIOLET RADIATION DRYING OVEN AND PRINTING MACHINE INCLUDING AT LEAST ONE SUCH DRYING OVEN

BACKGROUND OF THE INVENTION

1. Field of the Invention

The present invention is generally concerned with ultraviolet radiation drying ovens of the type used when the product to be dried is a synthetic product which must be polymerized to dry it.

It is more particularly directed, but not necessarily exclusively so, to the situation in which a drying oven of the above kind is designed to be fitted to a printing machine including a turret which is mounted to rotate about its axis and which carries, radially, at its periphery, a plurality of object-carrier supports which are themselves mounted to rotate on the turret, and at least one workstation which is fixed and past which the object-carrier supports move.

2. Description of the Prior Art

When, as is usually the case, the object to be treated must be printed several times in succession with different colors, a plurality of workstations is in practice circumferentially distributed around the axis of the turret; most of them are printing stations, although the first one can be a varnishing station, with at least one drying oven downstream of each workstation in the direction of rotation of the turret.

If the drying oven is an ultraviolet radiation drying oven, it usually includes a chamber containing the necessary lamp with a localized opening, through which the radiation passes, in line with the path of the object-carrier supports.

With an ultraviolet radiation drying oven of the above kind the problem arises of confining the radiation within the corresponding chamber.

Otherwise, this radiation could affect the operation of the adjacent workstation, causing premature and therefore untimely polymerization of the product used at that station.

This is the case in particular if a workstation is a screen-printing station.

If unintended ultraviolet radiation reaches a printing station of this kind, there is the risk of the mesh of the corresponding screen becoming progressively clogged.

To alleviate this drawback, it has been proposed to add a cover to the drying oven which, extending laterally on either side of the drying oven, forms a kind of corridor for the object-carrier supports, along which the object-carrier supports move before reaching the drying oven and after leaving it.

There is therefore always at least one object-carrier support between the chamber of the drying oven and the entry and exit of the corridor and this intercepts the corresponding radiation and prevents it being propagated to the outside.

However, the footprint of a cover of the above kind on the working area of the machine is large, which is to the detriment of its capacity in terms of workstations.

It has also been proposed to associate with the opening in the chamber of an ultraviolet radiation drying oven of the above kind a mask mounted to move between a closed position in which it interferes with the opening and an open position in which it exposes it.

Apart from the fact that prior art implementations of this kind are generally bulky at the present time, they are all always relatively complex and are not totally effective.

At present there usually remains a transient period during which, having to move from its closed position to its open position to allow an object-carrier support to pass it, the mask allows the radiation it has to intercept to filter out, at least momentarily.

A general object of the present invention is an arrangement which avoids these drawbacks.

SUMMARY OF THE INVENTION

To be more precise, the invention consists in an ultraviolet radiation drying oven including a chamber containing the necessary lamp and which has a localized opening for the radiation to pass through and, associated with the opening, a mask mounted to move between a closed position in which it interferes with the opening and an open position in which it exposes it, in which oven the mask is mounted to rotate relative to the chamber, is divided into two shutters in diametrally opposite positions and is associated with a second mask which is also divided into two shutters, is coaxial with the first mask and, like the first mask, is mounted to rotate relative to the chamber with a motion that is the converse of that of the first mask.

Because of the features of the invention, the footprint of the drying oven on the working area of the machine to which it is fitted is hardly greater than that of an object-carrier support, since it is sufficient for the rotary masks that it includes, in accordance with the invention, to be able to closely surround an object-carrier support of this kind.

The capacity of the machine, in terms of the number of workstations, can advantageously be increased commensurately.

Furthermore, because of the simultaneous use of two masks operating in opposite directions, propagation of radiation to the outside is prevented at all times, without any transient period during which radiation could escape.

The features and advantages of the invention will emerge from the following description which is given by way of example and with reference to the accompanying diagrammatic drawings.

BRIEF DESCRIPTION OF THE DRAWINGS

FIG. 2 is a partial view of the printing machine in axial section, in line with one of the drying ovens and to a larger scale.

FIG. 3 is a partial elevation view of the drying oven as seen in the direction of the arrow III in FIG. 2.

DETAILED DESCRIPTION OF THE PREFERRED EMBODIMENT

Figure 1:
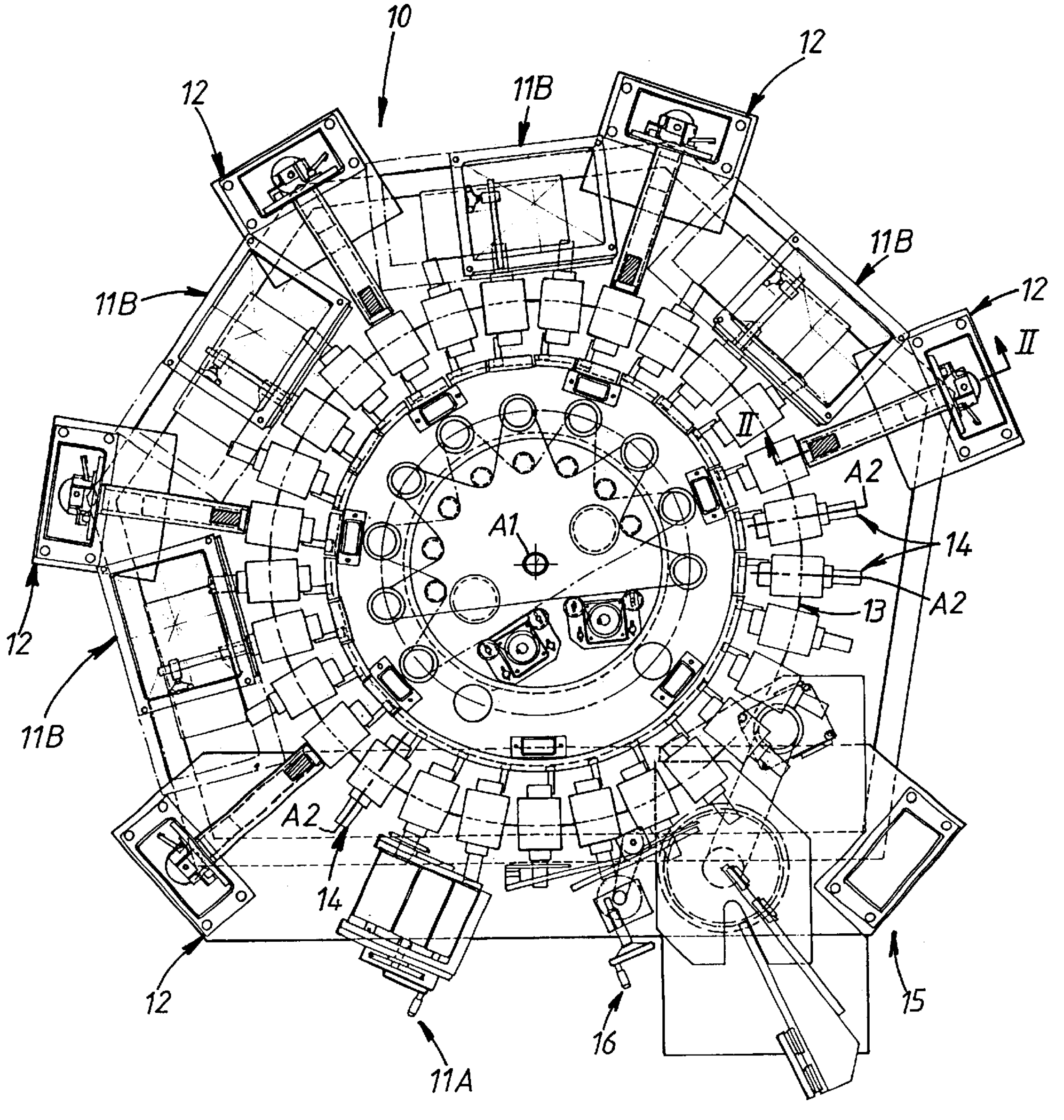
FIG. 1 is a plan view of a printing machine fitted with ultraviolet radiation drying ovens in accordance with the invention.

The figures show, by way of example, the application of the invention to a printing machine 10 including at least one workstation 11A, 11B associated with at least one drying oven 12.

Because the printing machine 10 is not of itself relevant to the present invention, it will not be described in detail here.

Only its component parts necessary to an understanding of the invention will be described.

In the embodiment shown, the printing machine 10 includes a circular contour turret 13, which is mounted to rotate stepwise about its axis A1 and which carries, radially, at its periphery, a plurality of object-carrier supports 14 which are themselves mounted to rotate on the turret 13 about axes A2 orthogonal to its axis A1, and a plurality of fixed workstations 11A, 11B and past which the object-carrier supports 14 move, there being a drying oven 12 downstream of at least one of the workstations 11A, 11B, in the direction of rotation of the turret 13, and in practice there is an oven downstream of each workstation 11A, 11B.

In the embodiment shown, the workstations 11A, 11B are preceded by a loading and offloading station 15 and by a flame treatment and dust removal station 16.

As shown here, for example, workstations 11A, 11B include a varnishing station 11A and a plurality of printing stations 11B.

In the embodiment shown, the printing stations 11B employ the screenprinting process.

Finally, in the embodiment shown, the object-carrier supports 14 are simple mandrels, the objects 18 to be printed being simple flexible tubes which merely have to be threaded over such mandrels, as shown diagrammatically in chain-dotted line for one of them in FIG. 2.

All the drying ovens used are identical.

They are ultraviolet radiation drying ovens.

Figure 4:
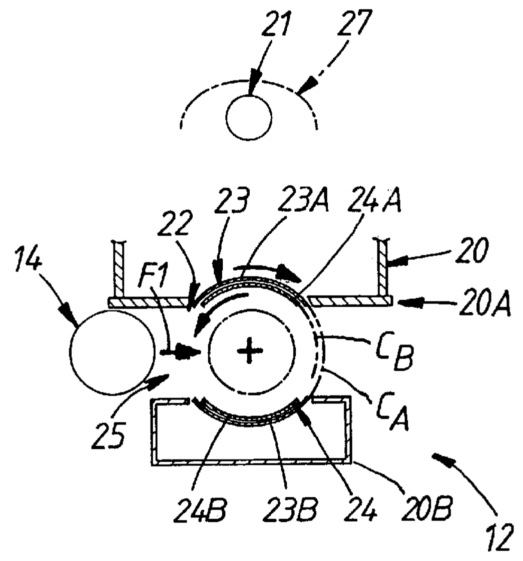
FIG. 4 is a partial view of it in cross section taken along the line IV—IV in FIG. 2.
Figure 5A:
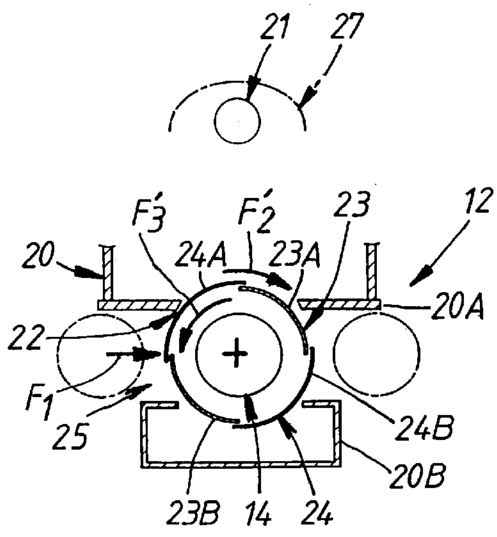
FIGS. 5A, 5B and 5C are partial views in axial section which are derived from that of FIG. 4 and show various successive phases of operation of the corresponding masks.
Figure 5B:
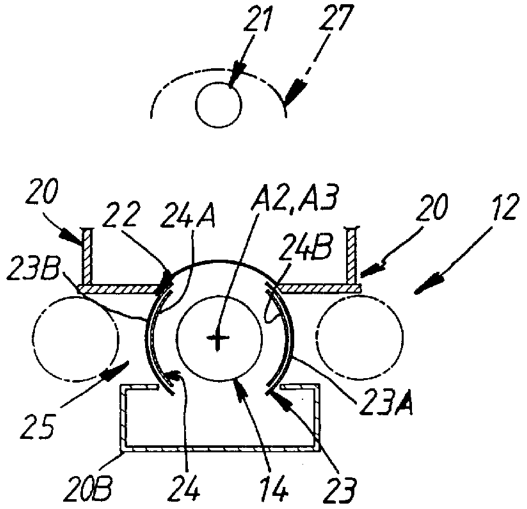

As seen best in FIG. 2, and in a manner that is conventional in itself, a drying oven 12 of this kind includes a chamber 20 containing the necessary lamp 21 and having a localized opening 22, facing the path followed by the object-carrier supports 14, through which the radiation passes and, associated with the opening 22, a mask 23 mounted to move between a closed position in which, as shown in FIGS. 2 and 4, it interferes with the opening 22 and an open position in which, as shown in FIG. 5B, it exposes it.

In accordance with the invention, the mask 23, which is mounted to rotate relative to the chamber 20 about an axis A3 that is radial relative to the turret 13, is divided into two shutters 23A, 23B in diametrally opposite positions and on respective opposite sides of the axis A3 and is associated with a second mask 24 which is also divided into two shutters 24A, 24B, is coaxial with the first mask 23 and, like the latter, is mounted to rotate relative to the chamber 20, with a motion contrary to that of the first mask 23.

In the embodiment shown, the chamber 20 has two parts 20A, 20B separated from each other, namely a top part 20A and a bottom part 20B, and the two parts 20A, 20B define between them a slot 25 in which the object-carrier supports 14 move and the masks 23, 24 operate.

As shown here, for example, the lamp 21 is in the top part 20A of the chamber and the corresponding opening 22 is in the bottom part of the top part 20A.

Alternatively, however, the lamp 21 can equally well be in the bottom part 20B of the chamber 20, in which case the corresponding opening 22 is formed by the top part of the bottom part 20B.

As shown here, for example, the chamber 20 is generally parallelepiped-shaped and the opening 22 in the bottom part of its top part 20A extends only a portion of its width, in the middle part thereof.

The drying oven 12 as a whole is elongate along a radius of the turret 13 and likewise the axis A3 of its masks 23, 24.

The lamp 21 is itself elongate along this radius and, as shown here, a reflector 27 is preferably associated with it to focus its radiation onto the top generatrix of the object-carrier supports 14.

The design is such that when an object-carrier support 14 is vertically aligned with the lamp 21, its axis A2 is aligned with the axis A3 of the masks 23, 24.

As in the embodiment shown, the shutters 23A, 23B, 24A, 24B of the masks 23, 24 preferably each extend in a circular arc about the axis A3 of the assembly.

As shown here, for example, each of the shutters 23A, 23B, 24A, 24B of each mask 23, 24 extends along a circular arc subtending an angle at the center close to 90°.

To be more precise, in the case of one of the masks 23, 24, here the radially outermost mask 23, the shutters 23A, 23B each extend along a circular arc subtending an angle at the center slightly greater than 90° and, in the case of the other mask 23, 24, here the radially innermost mask 24, the shutters 24A, 24B each extend in a circular arc subtending an angle at the center substantially equal to 90°.

Figure 5C:
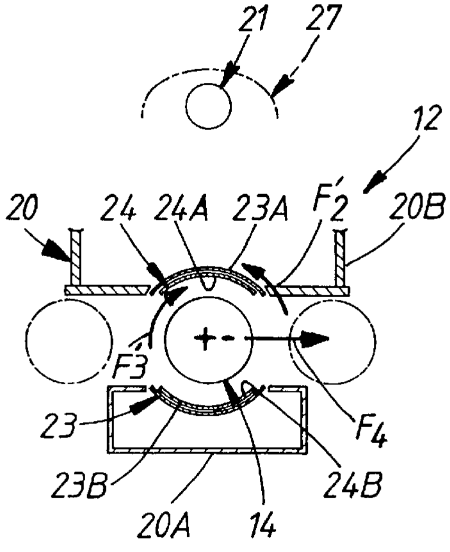

Accordingly, in the closed position shown in FIG. 4 and the open position shown in FIG. 5B, the shutters 23A, 23B of the outer mask 23 each project on either side of the respective shutters 24A, 24B of the inner mask 24, and in the intermediate positions shown in FIGS. 5A and 5C the shutters 23A, 23B of the mask 23 each slightly overlap the respective shutters 24A, 24B of the mask 24 at each end.

As in the embodiment shown, the two circumferences CA, CB along which the shutters 23A, 23B, 24A, 24B of the two masks 23, 24 extend are preferably near each other, to minimize the overall size of the assembly.

In the embodiment shown, the two shutters 23A, 23B of the mask 23 are in practice fastened to a sleeve 28 mounted to rotate in a fixed bush 29 and extend cantilever-fashion from the sleeve 28.

Likewise, the two shutters 24A, 24B of the mask 24 are fastened to a block 30 which is attached by a screw 31 to the end of a shaft 32 mounted to rotate in the previously mentioned sleeve 28 and extend cantilever-fashion from the block 30.

Parallel to the axis A3 of the assembly, the shutters 23A, 23B, 24A, 24B of the two masks 23, 24 are sufficiently long to extend either side of the lamp 21, extending largely beyond it.

As in the embodiment shown, the two masks 23, 24 are preferably operated synchronously.

As shown, for example, the two masks 23, 24 share the same drive system 34.

In the embodiment shown, the drive system 34 includes an actuator 35 whose body 36 is articulated at a fixed point 37 and whose piston rod 38 is articulated to a swing-arm 39 which is in turn mounted to pivot about a fixed point 40 in its middle area.

A first link 41 is articulated to the swing-arm 39 and to a flange 42 fastened to the sleeve 28, at a point 43 on the flange 42 which is eccentric to the axis A3 of the assembly.

Likewise, a second link 44 is articulated to the swing arm 39, on the side thereof opposite the articulation of the first link 41, and to a flange 45 fastened to the shaft 32, at a point 46 on the flange 45 which is eccentric to the axis A3 of the assembly.

Assume firstly that, as shown in FIGS. 2 and 4, the two masks 23, 24 are in the closed position and, as shown in continuous line in FIG. 4, an object-carrier support 14 reaches the immediate vicinity of the drying oven 12.

In this closed position, the shutters 23A, 24A of the masks 23, 24 are superposed on each other and globally extend from one to the other of the two radial edges of the opening 22 in the chamber 20 of the drying oven 12, and therefore intercept the radiation from the lamp 21.

The turret 13 advancing by one step, as symbolized by the arrow F1 in FIGS. 4 and 5A, the object-carrier support 14 is engaged in the slot 25 formed by the two parts 20A, 20B of the chamber 20, until it is vertically aligned with the lamp 21, as shown in chain-dotted line in FIG. 4 and in continuous line in FIG. 5A.

The two masks 23, 24 are then rotated and, as follows from what has been described above, the mask 23 turns in a first direction, for example the clockwise direction, as shown by an arrow F2 in FIG. 5A, and the mask 24 turns in the opposite direction, and therefore the counterclockwise direction here, as symbolized by an arrow F3 in FIG. 5A.

In practice, after their shutters 23A, 23B, 24A, 24B move to an intermediate position in which, as shown in FIG. 5A, they entirely surround the object-carrier support 14, the rotation of the masks 23, 24 is continued as far as their open position in which, as shown in FIG. 5B, their shutters 23A, 23B, 24A, 24B, which are again superposed, expose the opening 22 which is vertically in line with the lamp 21, the shutters 23A, 23B, 24A, 24B then interfering with the slot 25 formed by the two parts 20A, 20B of the chamber 20, extending globally from one of these parts 20A, 20B to the other one.

The object-carrier support 14 is then rotated about its axis A2, which at this time is coincident with the axis A3 of the masks 23, 24, to dry the object 18 (not shown) that the object-carrier support 14 is assumed to be carrying.

This rotation can continue over one or more turns.

After a rotation of the masks 23, 24 which is the opposite of the previous one, as symbolized by the arrows F'2 and F'3 in FIG. 5C, and after their shutters 23A, 23B, 24A, 24B have moved to an intermediate position in which, as previously, and as shown in FIG. 5A, they again entirely surround the object-carrier support 14, the masks 23, 24 are returned to their original closed position, FIG. 4, and, the object-carrier support 14 being therefore released, the turret 13 again advances by one step, as symbolized by a chain-dotted arrow F4 in FIG. 5C.

Likewise, a new object-carrier support 14 is then vertically aligned with the chamber 20, with its axis A2 aligned with the axis A3 of the masks 23, 24.

Operation then continues cyclically in the same manner as previously.

Of course, the invention is not limited to the embodiment described and shown, but encompasses any variant execution thereof.

What is claimed is:

1. An ultraviolet radiation drying oven including a chamber containing the necessary lamp and which has a localized opening for the radiation to pass through and, associated with said opening, a mask mounted to move between a closed position in which it interferes with said opening and an open position in which it exposes it, in which oven said mask is mounted to rotate relative to said chamber, is divided into two shutters in diametrally opposite positions and is associated with a second mask which is also divided into two shutters, is coaxial with said first mask and, like said first mask, is mounted to rotate relative to said chamber with a motion that is the converse of that of said first mask.

2. The drying oven claimed in claim 1 wherein said shutters of each of said masks each extend along a circular arc about an axis of the assembly.

3. The drying oven claimed in claim 2 wherein said shutters of each of said masks each extend along a circular arc subtending an angle at the center of approximately 90°.

4. The drying oven claimed in claim 3 wherein, in the case of one of said masks, said shutters each extend along a circular arc subtending an angle at the center slightly greater than 90° and, in the case of the other mask, said shutters each extend along a circular arc subtending an angle at the center substantially equal to 90°.

5. The drying oven claimed in claim 2 wherein said shutters of said two masks extend along two circumferences which are close together.

6. The drying oven claimed in claim 1 wherein said two masks are driven synchronously.

7. The drying oven claimed in claim 6 wherein said two masks share the same actuator system.

8. A printing machine including at least one workstation associated with an ultraviolet radiation drying oven as claimed in claim 1.

9. A printing machine as claimed in claim 8 including a turret, which is mounted to rotate about its axis and which carries, radially, at its periphery, a plurality of object-carrier supports which are themselves mounted to rotate on said turret, a plurality of fixed workstations past which said object-carrier supports move, and a drying oven downstream of at least one of said workstations in the direction of rotation of said turret.

10. The printing machine claimed in claim 9 wherein said drying oven and the axis of its masks are elongate along a radius of said turret.

11. The printing machine claimed in claim 9 wherein said chamber of said drying oven has two parts separated from each other, namely a top part and a bottom part, and said two parts define between them a slot in which said object-carrier supports move and said masks operate.

* * * * *